UNITED STATES PATENT OFFICE.

JORGE MALLISON, OF BUENOS AYRES, ARGENTINA.

PAINT.

SPECIFICATION forming part of Letters Patent No. 620,599, dated March 7, 1899.

Application filed April 11, 1898. Serial No. 677,221. (No specimens.)

*To all whom it may concern:*

Be it known that I, JORGE MALLISON, a resident of Buenos Ayres, Argentina, have invented an Improved Insulating Composition or Paint, of which the following is a specification.

This invention consists of a new composition to be used as a kind of paint or protection for roofs or walls of zinc, galvanized or plain iron, or any material that may be used in their construction which are exposed to the weather—intense heat or intense cold.

This composition is also applicable to glass, canvas awnings, tanks, or packing-cases of tin, wood, iron, and other materials.

The object of my invention is to prevent heat or cold affecting the interior of anything with which it is painted.

As is well known, buildings of iron and zinc are in general use in most hot countries, owing to their cheapness and facility of erection, their chief disadvantage being excessive heat in summer and cold in winter. The composition comprising my invention, which can be produced cheaply, will obviate the aforesaid inconveniences and completely insulate all metals and materials in so effectual a way that the influence of exterior heat or cold on the interior of rooms or buildings the roofs or walls of which have been painted with it will be reduced to a minimum.

The composition is composed of the juices of plants included in the families of "*Agaves aloes,*" "*Cactus,*" and "*Apuntias,*" also of the "*Agave Americano,*" "*Agave Mexicano,*" "*Agave fetida,*" "*Agave sisalana,*" "*Opuntia vulgaris,*" and the juices of the seeds of the quince. The juices of the following are also used in this preparation: "*Cactus cereus,*" "*Echinocactus,*" "*Echinopsis,*" "*Epiphyllum,*" "*Mamillaria,*" "*Melocactus,*" "*Pilocereus,*" and of the wild agaves "*Angustifolia,*" "*Minima,*" "*Longuifolia,*" and others.

The following is the formula I prefer to use in the preparation of my improved composition, making certain changes according to the climate for which it is required, viz: "*Agave Americano,*" "*Agave Mexicano,*" "*Agave sisalana,*" or "*Aloe vulgaris,*" in the fresh state, seventeen kilos; "*Opuntia vulgaris,*" three kilos; quince-seeds, one hundred grams. These are cut into strips and submerged in one hundred liters of water. At the end of from twenty-four to seventy-two hours in summer and from seventy-two to one hundred and twenty hours in winter all the juices required for the purpose will have been extracted. Add to this thirty kilos of unslaked lime. The composition is then in a fit state either for use or for putting up in tins or barrels.

Having fully described my invention, what I claim, and desire to secure by Letters Patent of the United States, is—

1. A paint or wash, comprising the juices of certain plants and seeds, which juices materially obstruct the free passage of heat-rays, such as the agave-plants and quince-seeds, water, and lime, substantially as set forth.

2. A paint or wash containing the juices of certain plants and seeds, which juices materially obstruct the free passage of heat-rays, such as the agave-plants and quince-seeds, substantially as set forth.

3. An improved composition or paint consisting of the juices of "*Agave Americano,*" "*Agave Mexicano,*" "*Agave sisalana,*" or "*Aloe vulgaris,*" in a fresh state, "*Opuntia vulgaris*" and quince-seeds, in combination with unslaked lime or the like, prepared substantially in the manner herein set forth.

4. A paint or wash, containing a vegetable juice which materially obstructs the free passage of heat-rays, such as the juice of a plant included in the families of *Agaves aloes, Cactus* and *Apuntias,* also the juice of the seeds of the quince, substantially as set forth.

JORGE MALLISON.

Witnesses:
W. J. THORN,
CHAS. ROCHE.